Oct. 17, 1961 W. J. SHANAHAN 3,005,045

VIDEO QUANTIZING AND CONTOUR LEVEL APPARATUS

Filed Feb. 10, 1956 3 Sheets-Sheet 1

INVENTOR.
WILLIAM J. SHANAHAN
BY George Sipkin
Lee S. Huntzberger
ATTORNEYS

VIDEO QUANTIZING AND CONTOUR LEVEL APPARATUS

Filed Feb. 10, 1956 3 Sheets-Sheet 2

INVENTOR.
WILLIAM J. SHANAHAN
BY George Sipkin
Lee I. Huntzberger
ATTORNEYS

Oct. 17, 1961 W. J. SHANAHAN 3,005,045
VIDEO QUANTIZING AND CONTOUR LEVEL APPARATUS
Filed Feb. 10, 1956 3 Sheets-Sheet 3
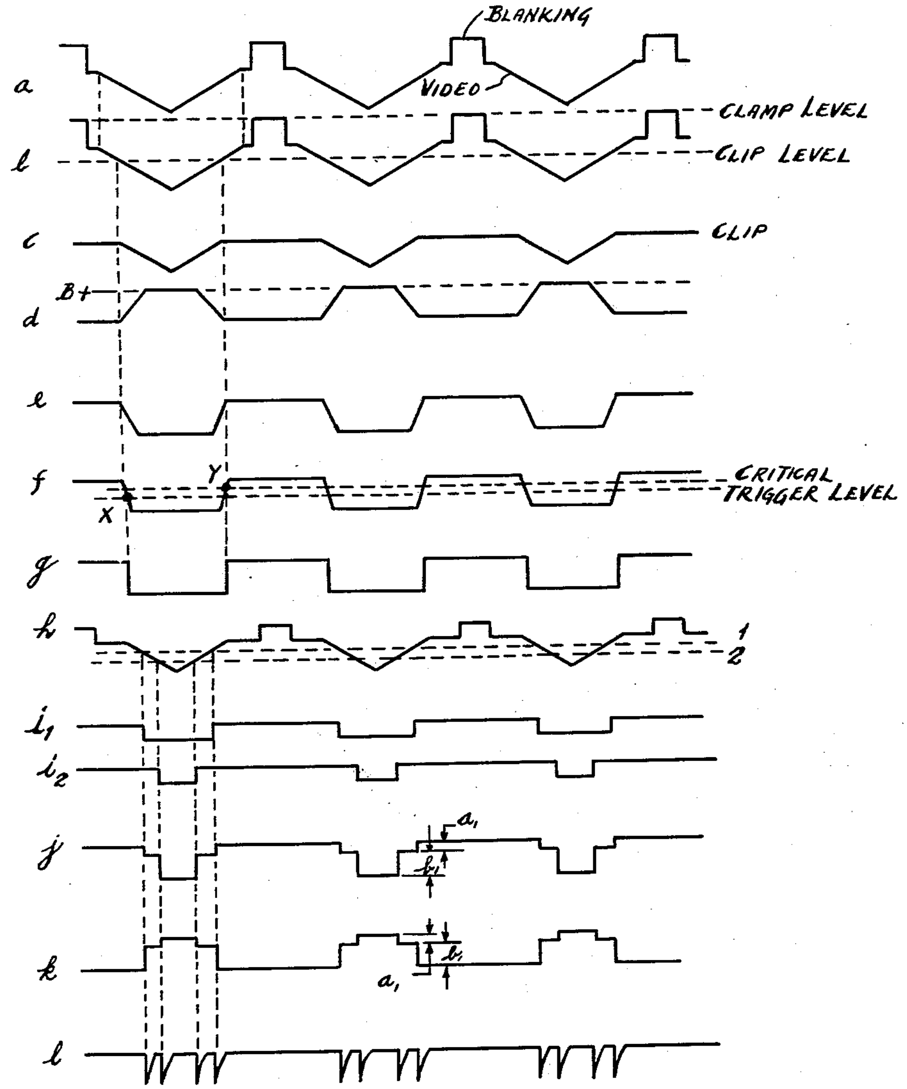
Fig. 3 (a, b, ---l)
INVENTOR.
WILLIAM J. SHANAHAN
BY
W. O. Quesenberry
ATTORNEY

3,005,045
VIDEO QUANTIZING AND CONTOUR LEVEL APPARATUS

William J. Shanahan, New York, N.Y., assignor, by mesne assignments, to the United States of America as represented by the Secretary of the Navy Filed Feb. 10, 1956, Ser. No. 564,833
4 Claims. (Cl. 178—6.8)

Figure 1:
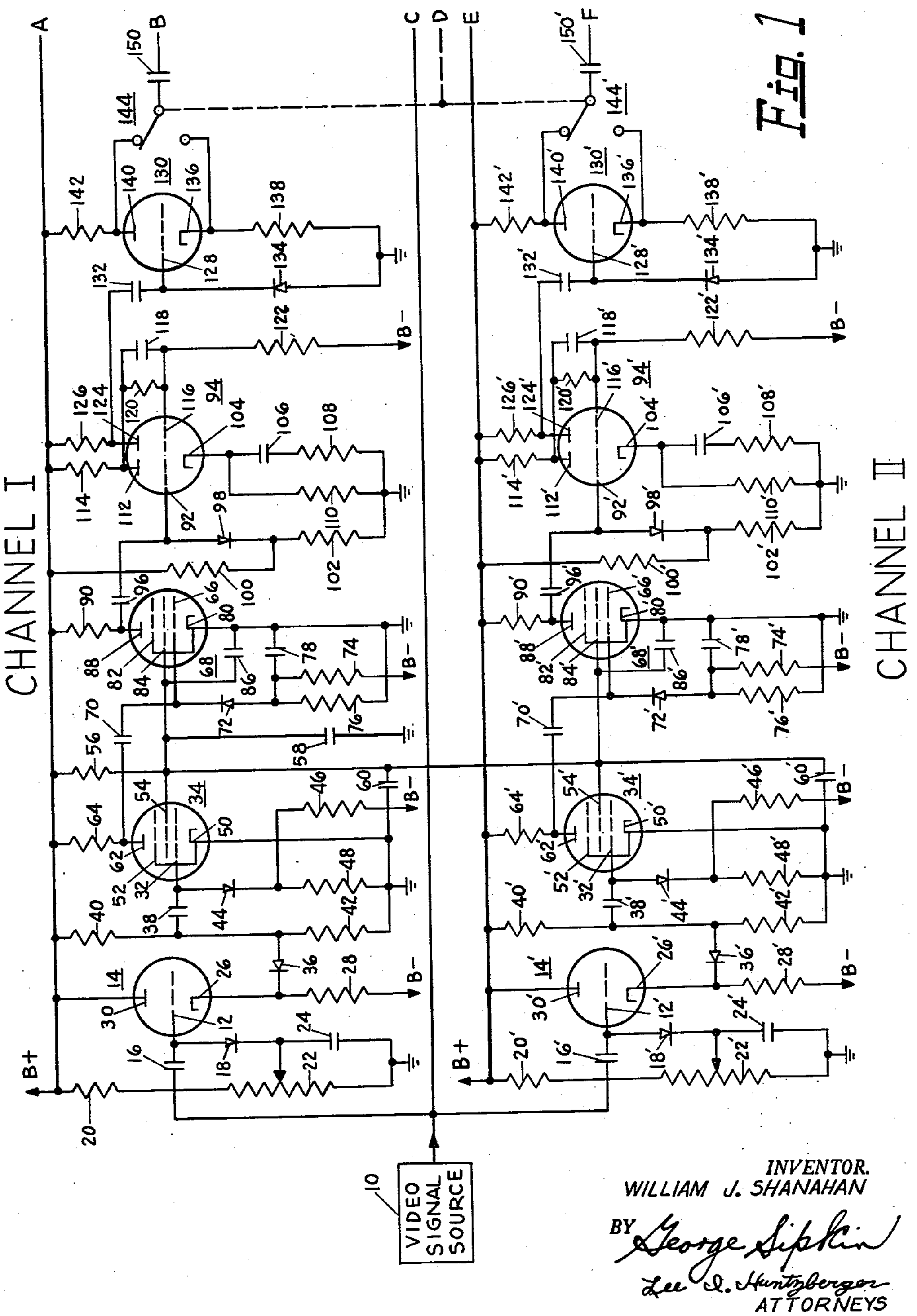

This invention relates to video quantization and contour level apparatus and, more particularly, to video quantization and contour level apparatus which may be incorporated in a television moving target indicating system.

In a television moving target indicating system, a televised scene is displayed on the screen of a long-persistence cathode ray tube and then, some seconds later, a second picture of the same scene is also displayed on the screen of the cathode ray tube superimposed on the first-displayed picture. Since the same scene is presented at two different times, there will be registration of the two superimposed pictures only for stationary objects of the televised scene. As far as moving objects are concerned, the two superimposed pictures will not be in registration, since the scene is "photographed" at two different times and the position of moving objects will have changed during the time interval between the first and second "exposures" thereof. This makes small motions of objects in the scene apparent.

In order to more easily observe lack of registration between the two superimposed pictures displayed on the screen of the cathode ray tube, one picture may be displayed as a positive, i.e., light objects in the original scene appearing light in the displayed picture and dark objects in the original scene appearing dark in the displayed picture, and the other picture may be displayed as a negative, i.e., light objects in the original scene appearing dark in the displayed picture and dark objects in the original scene appearing light in the displayed picture. If the positive and negative pictures are exactly superimposed, a uniform grey image results. If, however, there are slight differences between the two pictures, due to a lack of registration, dark or light spots or contour lines immediately become evident.

As discussed above, the second picture is "photographed" some seconds after the first picture. Therefore, the cathode ray tube employed must be capable of storing the first picture for the time interval between "exposures" to make possible the superimposition of the two pictures. Conventional fluorescent cathode ray tubes do not have a persistence anywhere long enough to be used for this purpose. It is therefore necessary to utilize as the cathode ray tube a dark-trace storage tube. Dark-trace storage tubes, which are well known in the art, are capable of semi-permanent storage of video information presented thereon, since by appropriate modulation of the electron writing beam thereof, a picture may be created which will persist until specific erasing means are employed. In addition, dark-trace storage tubes have the characteristic of darkening in the presence of applied signals, rather than fluorescing in the manner typical of conventional cathode ray tubes. The resulting image may therefore be viewed by reflected light.

From the above discussion, it becomes clear that in order to provide a practical television moving target indicating system, it is necessary to convert the televised video signals into such a form that they can be displayed on the dark-trace tube in alternate positive and negative polarity, so that the video signals making up the first-displayed picture is of the opposite sense from the video signals making up the second-displayed picture. If the writing beam of the dark trace tube is controlled so that there is a linear superimposition of the densities resulting from each of these video signals, a uniform grey will result, if the content of the two groups of video signals is unchanged. If, however, there is any change, even in a small area of the picture, the changes will make themselves evident by darker or lighter spots in the final image.

It is necessary, if the two groups of video signals are to be canceled on the face of the dark trace tube, to adjust the characteristics of the video circuits so as to produce an overall linear and additive characteristic in conjunction with the screen of the dark trace tube. The darkening effect of the screen of the dark trace tube is not only a function of the intensity of the writing beam, but depends also upon the magnitude of the signals which have previously been stored on the screen at the time of writing.

It will be evident, therefore, that with a reasonable amount of non-linearity and/or decay in contrast of the picture displayed on the screen of the dark trace tube between "exposures," the circuitry necessary for accurate cancellation can become so elaborate as to be impractical. In order to make it possible to avoid some of the difficulties due to the above-mentioned characteristics of the screen of the dark trace tube, it has been found desirable to modify the video signals applied to the intensity-modulation electrode of the dark trace tube.

This modification may take the form of video quantization, where the continuous range of video halftones, i.e., the range of video signal amplitudes, is converted into a series of discrete steps; or it may take the form of video contour level operation, where the continuous video signal is converted into a pulse-time modulated signal, producing a "cartoon" picture having only outlines or delineations of areas marking the change from one video level to another.

The video signal is quantized by transmitting it as a series of discrete shades of grey, rather than as a continuous black to white image. It is then possible to adjust levels for convenience of cancellation, despite non-linearities in the characteristics of the screen of the dark trace tube. For certain observed scenes, where outlines are of major prominence, the use of a two level, or black and white, quantized video signal may produce a far more distinct and legible signal than a presentation with full dynamic range. If an intermediate third level or "grey" is added, it is very simple to observe the edges of objects and still retain considerable intermediate detail. A fourth level would allow almost perfect reproduction of simple scenes.

When quantizing is employed, it is easily possible to adjust the characteristics of the video amplifier used for positive and negative transmission by adjusting the outputs of suitably cascaded limiters. This allows independent adjustment of each increment.

By combining quantization with inversion, the picture is considerably easier to evaluate than one produced by the simple superimposition of video signals.

Contour video level operation for providing a delineated image of a selected scene is achieved by applying the output of the quantizing circuits to pulse generators which produce pulses or "pips" at the leading and trailing edge of each of the square wave outputs from the quantizing circuits. This produces a line drawing effect which is susceptible of easy interpretation in the case of particular types of scenes. The outlines appear as dark lines surrounding each of the areas of interest. It should be noted that in the use of video contour level operation, it is not required that the video signals be inverted to provide alternate positive and negative images for the two "exposures." A pair of successive superimposed delineated images of a scene will indicate any movement in the scene between the two exposures through nonregistration of a delineated portion of the superimposed images.

It is therefore an object of this invention to provide apparatus for converting a full-range intelligence signal, such as a video signal, into a quantized signal in which a stepped-wave output signal is produced having two or more discrete levels, the discrete level of the output signal being a function of the amplitude of the original intelligence signal.

An object of this invention is to modify a signal characterized by a tonal range, e.g., a video signal that corresponds to an image whose tonal range is continuous or irregularly discontinuous, whereby the modified signal is a quantized or stepped-wave signal having two or more discrete well-defined amplitude levels, where each of the amplitude levels of the modified signal corresponds to a predetermined portion of the tonal range of the original signal.

A further object is to modify a signal characterized by a tonal range, e.g., a video signal that corresponds to an image whose tonal range is continuous or irregularly discontinuous, whereby the modified signal is a train of narrow equal-amplitude pulses where each pulse corresponds to an excursion of the original signal in either direction across one of a plurality of predetermined levels within the tonal range.

It is a further object of this invention to provide apparatus for converting a full-range intelligence signal, such as a video signal, into a contour-level signal in which a pulse output signal is produced only in response to the amplitude of the original intelligence signal passing through one or more discrete levels.

It is a still further object of this invention to provide apparatus adapted to be incorporated in a television moving target indicating system for the purpose of making the display of moving targets more distinct so that they can be more readily observed.

Figure 2:
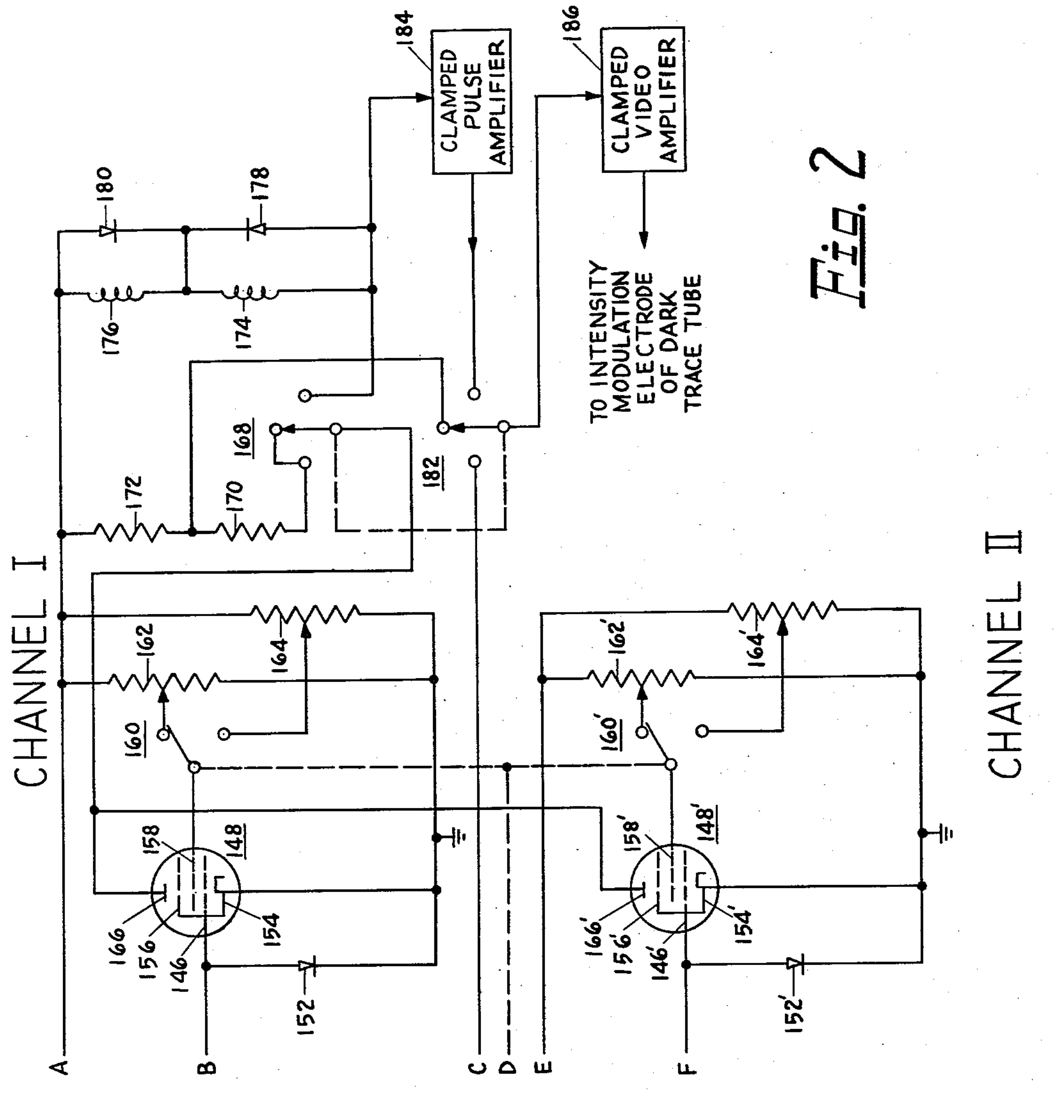

Other objects and many of the attendant advantages of this invention will be readily appreciated as the same becomes better understood by reference to the following detailed description when considered in connection with the accompanying drawings wherein:

FIGS. 1 and 2 when joined together at ABCDEF form a composite block and schematic diagram of an embodiment of the invention.

FIG. 3 includes a series of waveforms for use in explaining the operation of the disclosed embodiment of the invention.

Referring now to the drawings, there are shown therein two identical channels, channel I and channel II. Although only two channels have been shown for illustrative purposes, any number of additional identical channels is within the contemplation of this invention.

Considering first channel I, the output of video signal source 10, which may be a television camera or a recorder that had previously recorded signals from a television camera, of a television moving target indicating system, is applied to the control electrode 12 of electron discharge device 14 through coupling capacitance 16. Control electrode 12 is clamped by means of unidirectional conducting device 18, connected as shown, to an adjustable positive bias potential provided by a voltage divider consisting of resistance 20 in series with potentiometer 22 connected between a point of fixed positive potential and a point of reference potential. Bypass capacitance 24 is connected between the movable tap of potentiometer 20 and the point of reference potential. Cathode 26 of electron discharge device 14 is connected to a point of fixed negative potential through load resistance 28. Anode 30 of electron discharge device 14 is connected directly to the point of fixed positive potential.

The output from electron discharge device 14, which is derived across load resistance 28, is applied to control electrode 32 of electron discharge device 34 through unidirectional conducting device 36, connected as shown, and coupling capacitance 38. The junction of unidirectional conducting device 36 and capacitance 38 is connected to the junction of a voltage divider consisting of resistance 40 and resistance 42 connected between the point of fixed positive potential and the point of reference potential. Control electrode 32 is clamped by means of unidirectional conducting device 44, connected as shown, to a negative bias potential provided by a voltage divider consisting of resistance 46 in series with resistance 48 connected between the point of fixed negative potential and the point of reference potential. Cathode 50 and suppressor electrode 52 of electron discharge device 34 are both connected directly to the point of fixed reference potential. Positive potential from the point of fixed positive potential is applied to screen electrode 54 of electron discharge device 34 through dropping resistance 56. Screen electrode 54 is bypassed to the point of reference potential by electrolytic capacitance 58 and by capacitance 60. Anode 62 is connected to the point of fixed positive potential through load resistance 64.

The output of electron discharge device 34, which is derived across load resistance 64, is applied to control electrode 66 of electron discharge device 68 through coupling capacitance 70. Control electrode 66 is clamped to a negative bias potential by means of unidirectional conducting device 72, connected as shown. This negative bias is provided by a voltage divider consisting of resistance 74 in series with resistance 76 connected between the point of fixed negative potential and the point of reference potential. The junction of resistances 74 and 76, which form this voltage divider, is bypassed to the point of reference potential by capacitance 78. Cathode 80 and suppressor electrode 82 of electron discharge device 68 are connected directly to the point of reference potential. Positive potential is applied to screen electrode 84 of electron discharge device 68 through dropping resistance 56. Screen electrode 84 is bypassed to the point of reference potential by electrolytic capacitance 58 and by capacitance 86. Anode 88 of electron discharge device 68 is connected to the point of fixed positive potential through load resistance 90.

The output from electron discharge device 68, which is derived across load resistance 90, is applied to control electrode 92 of electron discharge device 94 through coupling capacitance 96. Control electrode 92 is clamped to a positive bias potential by means of unidirectional conducting device 98, connected as shown. This positive bias is provided by a voltage divider consisting of resistance 100 in series with resistance 102 connected between the point of fixed positive potential and the point of reference potential. Cathode 104 of electrode discharge device 94 is connected to the point of reference potential through serially-connected capacitance 106 and resistance 108 and through resistance 110 which shunts serially-connected capacitance 106 and resistance 108. Anode 112 of electron discharge device 94 is connected to the point of fixed positive potential through load resistance 114.

The output derived across load resistance 114 is applied to control electrode 116 of electron discharge device 94 through coupling capacitance 118 and resistance 120. Control electrode 116 is properly biased by means of resistance 120 connected between anode 112 and control electrode 116 and resistance 122 connected between control electrode 116 and the point of fixed negative potential. Anode 124 of electron discharge device 94 is connected to the point of fixed positive potential through load resistance 126.

The output derived across load resistance 126 is applied to control electrode 128 of electron discharge device 130 through coupling capacitance 132. Control electrode 128 is clamped to the point of reference potential by means of unidirectional conducting device 134, connected as shown. Cathode 136 of electron discharge device 130 is connected to the point of reference potential through load resistance 138. Anode 140 of electron discharge device 130 is connected to the point of fixed positive potential through load resistance 142.

The output derived across load resistance 138 is applied to one fixed pole of double-throw switch means 144. The output derived across load resistance 142 is applied to the other fixed pole of double-throw switch means 144. The movable element of double-throw switch means 144 is coupled to control electrode 146 of electron discharge device 148 through coupling capacitance 150. Control electrode 146 is clamped to the point of reference potential by means of unidirectional conducting device 152, connected as shown. Cathode 154 and suppressor electrode 156 of electron discharge device 148 are connected directly to the point of reference potential. Positive potential is applied to screen electrode 158 of electron discharge device 148 through double-throw switch means 160 from the movable tap of either potentiometer 162 or potentiometer 164, both of these potentiometers being connected between the point of fixed positive potential and the point of reference potential. Switch means 160 is ganged, as shown, with switch means 144.

Channel II is identical to channel I in substantially all respects, corresponding elements thereof being identified by the same reference numerals with the addition of prime notations. The output of video signal source 10 is applied to the input of channel II in the same manner as it is applied to the input of channel I. The positive potential applied to screen electrode 54' of electron discharge device 34' and to screen electrode 84' of electron discharge device 68' of channel II is obtained through dropping resistance 56 of channel I, as shown. Switch means 144' and 160' of channel II are ganged with switch means 144 and 160 of channel I, as shown.

Anodes 166 of electron discharge device 148 and 166' of electron discharge device 148' are connected in parallel to the movable element of triple-throw switch means 168. The first and second fixed poles of triple throw switch means 168 are both connected through resistance 170 in series with resistance 172 to the point of fixed positive potential. The third fixed pole of triple-throw switch 168 is connected through load inductance 174 in series with load inductance 176 to the point of fixed positive potential. Load inductance 174 is shunted by unidirectional conducting device 178, connected as shown, and load inductance 176 is shunted by unidirectional conducting device 180, connected as shown.

The output from video signal source 10, in addition to being applied as an input to channels I and II, is also applied to the first fixed pole of triple-throw switch means 182. The output derived across load resistance 172 is applied to the second fixed pole of triple-throw switch means 182. The output derived across series-connected load inductances 174 and 176 is applied as an input to clamped pulse amplifier 184. The output from clamped pulse amplifier 184 is applied to the third fixed pole of triple-throw switch means 182. Triple-throw switch means 182, as shown, is ganged with triple-throw switch means 168. The movable element of triple-throw switch means 182 is coupled to the input of clamped video amplifier 186. The output from clamped video amplifier 186 is applied as an input to the intensity modulation electrode of the dark trace tube, not shown, of the television moving target indicating system.

The output of video signal source 10 of the television moving target indicating system, which is a full-range half-tone video signal, is applied directly through clamped video amplifier 186 to the intensity modulation electrode of the dark trace tube, when the movable elements of ganged switch means 168 and 182 are connected to the first fixed poles thereof.

When the movable elements of ganged switch means 168 and 182 are connected to the second fixed poles thereof, a three level quantized signal is applied through clamped video amplifier 186 to the intensity modulation electrode of the dark trace tube. This three-level quantized signal is obtained in the following manner:

The video signal source 10 may be a television camera or a recorder that had previously recorded the signals from a television camera. Line *a* on the waveform chart in FIG. 3 is an example of a signal that may be obtained from video signal source 10. The wave train in line *a* includes line scanning signals separated by blanking signals. The video waveform in line *a* is a simple one selected for purposes of this explanation. This particular video waveform arises in scanning a scene that is lightest in the center and is continuously graduated to substantially the same tonal shade of darkness at both sides.

The video signal from source 10 is fed to input stage 14 of channel I through the clamping circuit including condenser 16 and crystal 18 whereby the signal peaks are clamped to the positive voltage level provided at the tap of potentiometer 22. The resultant input to the grid of stage 14 is shown in line *b* of the waveform chart. The stage 14 is connected as a class A cathode follower. Therefore the voltage waveform that appears at its cathode 26 is a replica of the voltage input at grid 12 with the exception that the average D.C. voltage is slightly higher than that appearing on the grid 12 and the peak-to-peak excursion is slightly less. It is reasonable to disregard these differences and assume that the voltage on the cathode 26 is the same as the voltage on grid 12, shown in line *b* of the waveform chart.

At the junction of resistors 40 and 42 there is provided a positive voltage of say +20 volts in the absence of any input signal. This positive potential is somewhere within the amplitude range of the signal appearing on cathode 26 and is indicated in a broken line in line *b* of the waveform chart and defines a clip level for the signal appearing on cathode 26. Only that portion of the signal appearing on cathode 26 which is lower than the clip level is passed by crystal 36 since the crystal 36 is nonconducting when its cathode is positive relative to its anode. The output of crystal 36 is shown in line *c* of the waveform chart, its reference level being the clip level in line *b*.

The purpose of succeeding stages 34, 68, and 94 is to convert the waveform in line *c* of the waveform chart to a rectangular waveform of constant amplitude. In stages 34 and 68 pentodes are employed for high amplification. The plate resistors in all these stages should be as low as possible to achieve steepness. Sufficient negative bias is applied to the grids 32 and 66 to limit plate current below the level of maximum plate dissipation and maximum plate resstor dissipation and as closely as possible placing the operating points in the highest gain region of the tubes' characteristics.

The clipped signal at the output of crystal 36 is fed into amplifier stage 34 through a clamping circuit including condenser 38 and crystal 44 whereby the signal is clamped to a potential of say minus one volt provided by the junction of resistors 46 and 48. The waveform in line *c* is inverted and amplified in stage 34. If the peak-to-peak voltage of line *c* is sufficient to drive stage 34 to cutoff, the output waveform is partially squared up to trapezoidal form as shown in line *d* of the waveform chart.

The signal at the plate 62 is coupled into stage 68 through a clamping circuit including condenser 70 and crystal 72 whereby it is clamped to a voltage of say minus four to minus six volts provided at the junction of resistors 74 and 76. The clamp level is more negative than in the preceding stage because the signal is positive going. If the peak-to-peak amplitude of the positive going signal is large enough, stage 68 is driven to saturation whereby the signal is squared up still further by the amplifying and saturation-clipping of stage 68. The output from stage 68 is almost a rectangular waveform of constant amplitude as shown in line $e$ of the waveform chart.

Instead of using additional amplifier stages to square up the waveform to the extent required, a modified Schmitt trigger circuit 94 is used. This circuit includes a D.C.-coupled cathode-coupled multivibrator. The bias of the respective grids 92 and 116 is such that in the absence of a signal input to stage 94, the left hand side conducts and the right hand side is cut off. When a negative-going signal is applied to grid 92, current through plate resistor 114 decreases whereby the voltage at plate 112 increases. Plate 112 is coupled to grid 116 through resistor 120 whereby voltage on grid 116 rises. The voltage at cathode 104 drops with decrease in current having the effect of positive feedback. The right hand side of stage 94 suddenly is rendered conductive at a level limited by grid conduction. This condition of operation continues until grid 92 goes positive to the level necessary for triggering back to the original condition. This circuit may be likened to a cathode-coupled flip-flop. The signal at plate 82 shown in line $e$ is fed to stage 94 through the clamping circuit including condenser 96 and diode 98 whereby the signal is clamped to the positive voltage provided at the junction of resistors 100 and 102. A Schmitt type trigger circuit has a very small amount of hysteresis in that the trigger voltage for flipping is lower than that for flopping. The almost rectangular wave input to stage 94, shown in line $f$, is converted into a much better rectangular wave shown in line $g$ which appears at the plate 124. The hysteresis is of no significance because it is only of the order of one volt whereas input signal swing to the stage 94 is far greater, say 40 or 50 volts. The primary purpose of the Schmitt-type trigger circuit is to square up slowly varying waveforms such as shown on the waveform chart. Certain types of waveforms which already have sharp spikes have a sufficiently short rise time so that no such squaring action is necessary. In fact with waveforms of this type, the hysteresis effect and the capacitive loading of the plates may actually slow down response. Therefore, an auxiliary circuit consisting of condenser 106 and resistor 108 is connected in parallel with resistor 110. For very rapidly changing input voltages, resistor 108 is effectively connected in parallel with resistor 110, thereby decreasing the amount of feedback in the Schmitt circuit and permitting a considerably more rapid rise time.

The signal appearing at plate 124, shown in line $g$, is fed into a phase splitter 130 through a clamping circuit including condenser 132 and crystal 134 whereby the signal is clamped to ground. The switch 144 selects either the positive or negative versions of the signal.

The above description pertains only to channel I. Channel II functions in precisely the same manner as channel I except that a different value of input bias is selected by the tap of the potentiometer 22' so that clipping action in the two channels takes place at different levels. Attention is invited to line $h$ of the waveform chart wherein there is shown a waveform assumed as the output of source 10. The waveforms are clamped to two different voltage levels at the input of the two channels but the clipping level is the same in both channels. In line $h$ for simplicity, the waveform is shown in relation to two different clipping levels, 1 and 2. Lines $i_1$ and $i_2$ show the output signals from the respective channels. These waveforms represent quantizations of the original signal at more than one successive level. Line $j$ indicates the result of adding the waveforms shown in line $i$. It will be noted that line $j$ represents a crude approximation of the waveform shown in line $h$. If five or six such channels are employed, a fairly accurate representation of the original video waveform is obtained. The waveforms are added before being applied to the input electrode of the storage tube (Skiatron etc.).

At this point the relationship between the quantization principle and the functions of this invention are recapitulated. Assume a scene is "photographed" by the television camera and displayed after quantization on the face of the storage tube. After a predetermined interval the same scene is "photographed" again by the television camera, is quantized and converted to a negative and then superposed on the previous display of the scene on the face of the storage tube. If all elements of the scene are identical when the two "photographs" are snapped, the two displays will cancel each other out producing a substantially uniform shade or tone. If there is some difference between the two "photographs" of the scene, there is a relatively light or relatively dark spot on the area of each difference. The reason for quantization is to eliminate the effects of non-linearities; without quantization it is impossible to obtain a positive and negative reproduction of the scene wherein the shades in one are substantially exactly complementary to the shades in the other so that when added a uniform shade results. Quantization limits the gray shades to a finite number, actually a very small number making it possible to obtain a positive and negative wherein the gray shades in one are substantially exactly complementary to the gray shades in the other. Attention is invited to line $j$ of the waveform chart which shows the sum of lines $i_1$ and $i_2$. Waveforms $a_1$ and $b_1$ are obtained from separate and distinct channels; the amplitude of each may set at the desired level. By proper setting of the amplitudes of the waveforms from the respective channels, very close to perfect cancellation may be achieved. This phenomenon is seen more clearly if exaggerated. Assuming in line $j$ of the waveform chart that $b_1$ is considerably greater than $a_1$ because the tube characteristics is very much non-linear in the region of more positive signals. For example, it may take a voltage of say 40 volts when the tube is near cutoff to achieve a particular change in density or shade, and it may take about 20 volts to achieve the same change in density or shade when the tube is operated much closer to where it would draw grid current. By adjusting the relative amplitudes $a_1$ and $b_1$ in line $j$ the effect of nonlinearity is overcome. If the levels $a_1$, $b_1$, etc., are not correctly proportioned, a superimposed positive and negative in accordance with the preceding discussion, do not result in perfect cancellation, that is uniform gray or black, but rather a hodge-podge of areas including areas in which cancellation is good and other areas which are lighter and darker than the mean shade or background. With a result of this type it is virtually impossible to ascertain motion or changes in the photographed scene.

Assuming line $j$ of the waveform chart produces a positive photograph, the corresponding negative is produced by a waveform as in line $k$ of the waveform chart. The latter waveform is obtained by taking the inverse of waveforms shown in lines $i_1$ and $i_2$ and adding them with appropriate weighting factors. The purpose of the weighting factors is the same as mentioned above in connection with the proportions of amplitudes $a_1$ and $b_1$ in line $j$, namely that the quantized step closer to tube cutoff must be larger than the quantized step closer to grid current to produce the same density changes.

Referring back to FIG. 1, the signals obtained from the plates or cathodes, respectively, of stages 130 and 130' must be added in suitable combining networks having the necessary response characteristics pointed out above in connection with lines $j$ and $k$ of the waveform chart in order to obtain the proper gamma correction. Leads B and F transfer the rectangular waveforms obtained from the plates or cathodes of stages 130 and 130', respectively. The waveform from stage 130 is fed through line B, clamped to ground by the combination of condenser 150 and crystal 152 and applied to the grid 146 of stage 148. The waveform from stage 130' is fed through line F, clamped to ground by the combination of condenser 150' and crystal 152' and applied to the grid 146' of stage 148'. The amplitudes of the signals are such that they can drive the pentodes from zero bias to cutoff. The amplitudes of the rectangular waveforms at the plates of the stages 148 and 148' are determined by the screen grid voltage because the control grids are driven from cutoff to saturation. Variable screen voltage controls 160 and 160' including two potentiometer branches in each are included in the stages 148 and 148'. For the waveforms corresponding to a snapshot positive one set of screen grid voltages are selected, and for the waveforms corresponding to a snapshot negative, the other set of screen grid voltages are selected. The switches 144, 144', 160, 160' are ganged. Stages 148 and 148' include common plate resistors 170 and 172 wherein the waveforms are added. The output waveform is taken at the junction of resistors 170 and 172 to minimize loading on the plate load resistance. The resultant signal is fed through amplifier 186 to the intensity modulation electrode of the storage tube.

From the foregoing discussion, it will be seen that channel I will produce a squarewave output signal which is at one certain level when the amplitude of the applied video signal is below a first particular magnitude determined by the setting of potentiometer 22, and which is at another certain magnitude when the amplitude of the applied video signal is above the first particular level determined by the setting of potentiometer 22. Similarly, the output of channel II is also a square wave which has one certain magnitude when the amplitude of the applied video signal is below a second particular level determined by potentiometer 22', and which is another certain magnitude when the amplitude of the applied video signal is above the second particular level determined by the setting of potentiometer 22'. Since potentiometers 22 and 22' are operated with differential settings of the movable taps thereof, the combined output derived across load resistances 170 and 172 will have a first magnitude when the amplitude of the applied video signal is below both the first and second particular levels determined by potentiometers 22 and 22'; will have a second magnitude when the amplitude of the applied video signal is above one of the first and second particular levels determined by potentiometers 22 and 22' and below the other of the first and second particular levels determined by potentiometers 22 and 22'; and will have a third magnitude when the amplitude of the applied video signal is greater than both the first and second particular levels determined by potentiometers 22 and 22'. Therefore, depending upon whether ganged switch means 144, 160, 144' and 160' are in their positive or negative picture position, the first magnitude of output derived across load resistance 172 will produce either white or black when applied to the intensity modulation electrode of dark trace tube through clamped video amplifier 186, the second magnitude of output will produce grey, and the third magnitude of output will produce either black or white. The relative intensities between the positive and negative superimposed displayed pictures are independently controllable by means of potentiometers 162, 164, 162' and 164' to provide perfect cancellation for stationary objects. As far as moving objects are concerned, they will be indicated by separated dark and light spots.

This circuit is afforded utility in addition to that described, by means of the circuitry on the right hand side of FIG. 2. The latter includes 3-position ganged switches 168 and 182. In the position of switches 168 and 182 shown in FIG. 2 the quantized signal is fed to the storage tube as described above. In use in this position, a positive signal of at least one frame's duration and sometimes several frames' duration is applied to the "wiped-clean" storage tube after the desired intervening period, the switches 144 and 144' are actuated after which a negative waveform of corresponding duration is applied. In the counterclockwise position of the switches 168 and 182 the signal from video source 10 is coupled to the storage tube. In the clockwise position of switches 168 and 182 a contour signal is produced which consists mainly of a series of constant amplitude pips for outlining the various shade levels provided by the quantized waveform. This is true regardless whether a positive or a negative picture is to be displayed. In effect, this produces a delineated cartoon-like image by outlining areas in the original picture. Each outlined area is one in which the density or tonal shade is somewhere between predetermined quantization limits. This is obtained as follows: The plate load for the stages 148 and 148' is changed to differentiating coils bridged by crystals 178 and 180. It is important to keep in mind that a constant current source (pentode) feeding an inductance produces an output signal which is proportional to rate of change of current. Hence, coils 174 and 176 produce sharp positive and negative pulses. The crystals 178 and 180 select only the positive pulse output and also prevent ringing or oscillation due to stray capacity in the coils. The resultant pips are shown in line *l* of the waveform chart. They are fed through clamped pulse amplifier 184 which determines their base line, and clips, if necessary, to produce a constant amplitude. Thence the pips are fed through switch 182 to amplifier 186 and thence to the intensity modulation electrode of the storage tube.

When these "pips" are applied to the intensity modulation electrode of the dark trace tube, after passing through clamped video amplifier 186, they produce on the screen of the dark trace tube a black line which occurs simultaneously with a change in the magnitude of the combined output of channels I and II, thereby producing an outline of the areas of the displayed scene. Lack of registration between corresponding lines in the two superimposed displays are indicative of a moving object, the registration between corresponding lines being perfect for stationary objects.

While in line *h*, there has been assumed a simple triangular waveform having a single excursion up and down past the clipping levels 1 and 2 during each scan, a typical video signal will contain many excursions during a scan; during each of such excursions a quantized waveform having one or more steps is obtained. For each excursion, the contour generating circuit provides one pip as in line *l* of the waveform chart.

For some types of video signals, e.g., of correspondence, the use of a contour or quantized waveform results in a striking image which conveys more information to the viewer than the original video signal.

The techniques discussed in this case may be applied to all types of storage tubes having a screen for visual display, wherein the tubes have nonuniform or nonlinear response, or in which a contour or quantized type of presentation is required.

Obviously many modifications and variations of the present invention are possible in the light of the above teachings. It is therefore to be understood that within the scope of the appended claims the invention may be practiced otherwise than as specifically described.

I claim:

1. A video quantizing circut comprising a plurality of substantially identical circuit channels having an input end in common for connection to a video signal source that translates a selected scene into a video signal, each of said circuit channels including a first means for blocking all of a video signal input thereto except for those amplitude excursions of the video signal input which extend beyond a predetermined signal amplitude level, the predetermined signal amplitude level in each of said channels respectively being different from one another, each of said circuit channels further including second means coupled to the first means thereof for producing a constant amplitude rectangular wave form wherein the leading edge of each pulse of the wave form from any one of said channels is substantially coincident with an amplitude excursion of the video signal in one direction across the predetermined amplitude level of that channel and the trailing edge of each pulse of the waveform from that channel being substantially coincident with an excursion of the video signal in the other direction across the predetermined signal amplitude level of that channel, and a circuit coupled to the output ends of all of said channels and responsive to the output signals therefrom for producing a signal which when applied to a cathode ray display device, will produce an image that is similar to the selected scene that was translated into the video signal.

2. A video quantizing circuit comprising a plurality of substantially identical circuit channels having an input end in common for connection to a video signal source that translates a selected scene into a video signal, each of said circuit channels including a first means for blocking all of a video signal input thereto except for those amplitude excursions of video signal input which extend beyond a predetermined signal amplitude level, the predetermined signal amplitude level in each of said channels respectively being different from one another, each of said circuit channels further including second means coupled to the first means thereof for producing a constant amplitude rectangular waveform wherein the leading edge of each pulse of the rectangular waveform from any one of said channels is substantially coincident with an amplitude excursion of the video signal in one direction across the predetermined amplitude level of that channel and the trailing edge of each pulse of the rectangular wave form from that channel being substantially coincident with an excursion of the video signal in the other direction across the predetermined signal amplitude level of that channel, and a combining circuit including differentiating means coupled to the output ends of all of said channels for producing a resultant wave form which is in the form of a train of unidirectional pips, there being one pip coincident with each leading edge and each trailing edge of each pulse of each of the rectangular waveform outputs of said channels respectively, whereby when said resultant waveform is applied to the intensity modulation electrode of a cathode ray tube with suitable deflection, there will be produced a delineated image of the selected scene that was translated into the video signal.

3. A video quantizing circuit comprising a plurality of substantially identical circuit channels having an input end in common for connection to a video signal source that translates a selected scene into a video signal, each of said circuit channels including a first means for blocking all of a video signal input thereto except for those amplitude excursions of the video signal input which extend beyond a predetermined signal amplitude level, the predetermined signal amplitude level in each of said channels respectively being different from one another, each of said circuit channels further including second means coupled to the first means thereof for producing a constant amplitude rectangular waveform wherein the leading edge of each pulse of the waveform from any one of said channels is substantially coincident with an amplitude excursion of the video signal in one direction across the predetermined amplitude level of that channel and the trailing edge of each pulse of the waveform from that channel being substantially coincident with an excursion of the video signal in the other direction across the predetermined signal amplitude of that channel, and a combining circuit coupled to the output ends of all of said channels and having a resistive load for summing the outputs from all of said channels to produce a resultant quantized video signal which approximates the video signal input to said channels, and which when applied to the intensity modulation grid of a cathode ray tube with suitable deflection means will produce an image similar to the selected scene that was translated into the video signal and characterized by distinct shades that differ stepwise, and where the number of shades exclusive of background shade is equal to or less than the number of said channels, and the densities of the shades are related to the amplitudes of the waveform from said channels.

4. A video quantizing circuit comprising a plurality of substantially identical circuit channels having an input end in common for connection to a video signal source, each of said circuit channels including a first means for blocking all of a video signal input thereto except for those amplitude excursions of the video signal input which extend beyond a predetermined signal amplitude level, the predetermined signal amplitude level in each of said channels respectively being different from one another, each of said circuit channels further including second means coupled to the first means thereof for producing a constant amplitude rectangular waveform wherein the leading edge of each pulse of the waveform from any one of the second means is substantially coincident with an amplitude excursion of the video signal in one direction across the predetermined amplitude level of that channel and the trailing edge of each pulse of the waveform from that second means is substantially coincident with an excursion of the video signal in the other direction across the predetermined signal amplitude of that channel, a phase splitter coupled to each of said second means respectively for providing in response to the input waveform thereto two rectangular waveforms which are mirror images of one another, an amplifier for each of the phase splitters, all of said amplifiers having a resistive load in common, each of said amplifiers including bias means for providing one of two bias levels to the amplifier whereby each amplifier has one gain factor at one of the bias levels and another gain factor at the other of its two bias levels, ganged switch means simultaneously coupling the input end of each amplifier to the positive waveform output of the respective phase splitter and also connecting each amplifier to a particular one of its two bias levels, or simultaneously coupling the input end of each amplifier to the negative waveform output of the respective phase splitter and also connecting each amplifier to the other one of its two bias levels, whereby if a selected scene is translated into a video signal and the latter is applied to said quantizing circuit when said switch means is in one of its two positions and the resultant output signal of said quantizing circuit is applied to the intensity modulation grid of a cathode ray storage tube having suitable deflection means to provide an image on the screen of the storage tube and then if said selected scene is again translated into a video signal but at a later time and the latter video signal is applied to said quantizing circuit with said switch means is in the other of its two positions and the output signal of the quantizing circuit is applied to the storage tube under the same conditions, the image on the storage tube is cancelled producing a substantially uniform continuous shade at every point where the scene was unchanged between those two times that the scene was translated into video signals, and showing lighter or darker spots than the above mentioned shade wherever there are differences in the scene at those two times, the two bias levels of each of said amplifiers being such as to produce said uniform continuous shade on the storage tube when the video signal input for both positions of said switch are identical.

References Cited in the file of this patent

UNITED STATES PATENTS

| | | |
|---|---|---|
| 2,420,013 | Rajchman | May 6, 1947 |
| 2,486,391 | Cunningham | Nov. 1, 1949 |
| 2,490,530 | Loughlin | Dec. 6, 1949 |
| 2,654,833 | Lord | Oct. 6, 1953 |
| 2,740,071 | Goldmark et al. | Mar. 27, 1956 |
| 2,764,681 | Howell | Sept. 25, 1956 |

FOREIGN PATENTS

| | | |
|---|---|---|
| 1,103,375 | France | May 18, 1955 |